(12) United States Patent
Kitazawa et al.

(10) Patent No.: US 6,329,728 B1
(45) Date of Patent: Dec. 11, 2001

(54) CYLINDER-TYPE LINEAR SYNCHRONOUS MOTOR

(75) Inventors: Kazuyuki Kitazawa; Nobuji Suzuki; Kazuhiko Takizawa, all of Tokyo (JP)

(73) Assignee: Sanyo Denki Co., Ltd., Tokyo (JP)

( * ) Notice: Subject to any disclaimer, the term of this patent is extended or adjusted under 35 U.S.C. 154(b) by 0 days.

(21) Appl. No.: 09/520,741

(22) Filed: Mar. 8, 2000

(30) Foreign Application Priority Data

Mar. 9, 1999 (JP) .................................................. 11-061591

(51) Int. Cl.[7] .................................................. H03K 4/03
(52) U.S. Cl. .................................................. 310/14
(58) Field of Search .................................. 310/12, 13, 14, 310/42

(56) References Cited

U.S. PATENT DOCUMENTS 4,760,294 * 7/1988 Hansen .................................. 310/13
5,844,332 12/1998 Lee .......................................... 310/13

FOREIGN PATENT DOCUMENTS 5-25981   2/1993  (JP) .
2718641   8/1995  (JP) .
2955529   7/1999  (JP) .
11-332211 11/1999 (JP) .

* cited by examiner

Primary Examiner—Nestor Ramirez
Assistant Examiner—Judson H. Jones
(74) Attorney, Agent, or Firm—Rankin, Hill, Porter & Clark LLP (57) ABSTRACT

A cylinder-type linear synchronous motor including a stator of which assembling is facilitated. A movable element is constructed by fitting annular permanent magnets on a magnet mount 29 fixed on a direct-acting shaft so that N and S poles are alternately arranged in an axial direction thereof. A plurality of stator core units 35 fixed in a frame so as to be spaced from each other at equal intervals in a peripheral direction of the movable element. The stator core units each constituted by combining a plurality of stator core divisions with each other. Exciting windings each are constituted of an annular winding formed by annularly winding a conductive wire so as to surround the movable element in the peripheral direction thereof. The annular windings each are fitted at a part thereof in a slot formed between each axially adjacent two of magnetic pole sections of the stator core units.

18 Claims, 8 Drawing Sheets

CYLINDER-TYPE LINEAR SYNCHRONOUS MOTOR

BACKGROUND OF THE INVENTION

This invention relates to a cylinder-type linear synchronous motor, and more particularly to a cylinder-type linear synchronous motor wherein a movable element carries out linear motion.

Currently, a cylinder-type linear stepping motor or linear pulse motor is commercially available as a cylinder-type linear motor. The cylinder-type linear stepping motor commercially available includes a stator constituted of a plurality of stator cores formed on an inner peripheral surface thereof with a plurality of small teeth so as to be arranged in an axial direction of a direct-acting shaft and having exciting windings wound thereon and a movable element including a movable section fixed on the direct-acting shaft, provided therein with permanent magnets and formed on an outer peripheral surface thereof with a plurality of small teeth in a manner to be arranged in the axial direction of the direct-acting shaft. In the linear stepping motor thus constructed, the exciting windings on the stator cores are excited in turn, to thereby permit thrust to be generated between the small teeth of the stator and those of the movable element, leading to linear motion of the direct-acting shaft. Unfortunately, the linear stepping motor fails to provide thrust at an increased magnitude, although it exhibits increased position control performance.

In view of the foregoing, the assignee proposed a cylinder-type linear synchronous motor which provides thrust at an increased magnitude although it is somewhat deteriorated in position control performance, as disclosed in Japanese Patent Application No. 130051/1998.

More particularly, the cylinder-type linear synchronous motor proposed is constructed into a structure that a plurality of annular windings are fitted in a plurality of slots of a stator core corresponding thereto, respectively. However, the structure causes the stator core to be designed for every motor varied in length in an axial direction thereof. Also, it renders assembling of the stator troublesome. Further, it fails to reduce a width of an opening of each of the slots positioned opposite to a movable element, to thereby enhance performance of the motor.

SUMMARY OF THE INVENTION

The present invention has been made in view of the foregoing disadvantage of the prior art.

Accordingly, it is an object of the present invention to provide a cylinder-type linear synchronous motor including a stator which permits a length thereof in an axial direction of the motor to be set as desired.

It is another object of the present invention to provide a cylinder-type linear synchronous motor including a stator which is constructed so as to facilitate assembling thereof.

It is a further object of the present invention to provide a cylinder-type linear synchronous motor which includes annular windings and permits a reduction in width of an opening of each of slots of a stator facing a movable element.

In accordance with the present invention, a cylinder-type linear synchronous motor is provided. The cylinder-type linear synchronous motor generally includes a movable element and a stator. The movable element includes a direct-acting shaft arranged so as to be reciprocated in an axial direction thereof, a magnet mount fixed on the direct-acting shaft and at least one permanent magnet train constituted by a plurality of permanent magnets fixed on the magnet mount and arranged in the axial direction. The permanent magnet train may be constituted by either a plurality of permanent magnets physically combined with each other or a plurality of permanent magnets formed by physically magnetizing a single magnetic body so that N and S poles alternately appear on the magnetic body in a longitudinal direction thereof. When plural such permanent magnet trains are arranged, the permanent magnet trains are preferably spaced from each other at equal intervals in a peripheral direction of the direct-acting shaft. In this connection, annular permanent magnets magnetized so that N and S poles appear on an outer surface thereof each may be provided so as to constitute each of the permanent magnet trains. More specifically, the annular permanent magnets are securely fitted on an outer periphery of the magnet mount of the movable element so that N and S poles are alternately arranged so as to be spaced from each other at predetermined intervals in the axial direction. Such arrangement of the annular permanent magnets causes portions of the annular permanent magnets opposite to magnetic pole sections of a stator core to act as permanent magnets constituting each of the permanent magnet trains. In corporation of the annular permanent magnets into the motor permits the movable element to be simplified in structure and facilitates mounting of the permanent magnets on the magnet mount.

The stator includes at least one stator core unit and a plurality of annular windings arranged so as to be spaced from each other at predetermined intervals in the axial direction and in a manner to surround the movable element. The stator core unit includes a plurality of magnetic pole sections arranged so as to be opposite to the permanent magnet train of the movable element with a redetermined interval defined therebetween and a yoke for magnetically connecting the magnetic pole sections to each other. The magnetic pole sections are spaced from each other at intervals in the axial direction so that a slot in which each of the annular windings is fitted at a part thereof is defined between each adjacent two of the magnetic pole sections. The slots each include an opening open to the movable element and a winding receiving section in which at least a part of each of the annular windings is received. The opening has a width in the axial direction formed so as to be smaller than a width of the winding receiving section in the axial direction.

In the cylinder-type linear synchronous motor, a direction of an exciting current flowing each of the annular windings or exciting windings of the stator is shifted to change a polarity of a magnetic pole appearing on a magnetic face of each of the magnetic pole sections, to thereby generate a shifting magnetic field, resulting in generating thrust between the permanent magnet train and the plural magnetic pole sections which acts to shift the direct-acting shaft in the axial direction. An AC current may be used as the exciting current. This permits a polarity appearing on the magnetic pole face of each of the magnetic pole sections to be varied depending on a frequency of the current. Multi-phase exciting currents may be flowed through the exciting windings. This results in the motor being a multi-phase synchronous motor, to thereby provide thrust at an increased magnitude. When a polarity of the exciting current and a magnitude thereof are fixed, a position of the movable element is fixed because only suction force acts between the stator and the movable element.

In the case of a rotary motor, excitation of each magnetic pole section of a stator core unit requires winding a conductive wire on an outer periphery of the magnetic pole section. Application of such a technique of the rotary motor into a linear synchronous motor causes a length of the motor in an axial direction thereof to be increased and operation of forming windings to be highly troublesome. In view of the problem, in the present invention, the exciting windings of the stator each constituted of the annular winding formed by annularly winding a conductive wire so as to surround a circumference of the movable element. Also, the present invention, as described above, is so constructed that the slot in which each of the annular windings is fitted at a part thereof is defined between each adjacent two of the magnetic pole sections. Such construction permits a magnetic flux generated from the exciting winding fitted in each of the slots to circulatedly flow through two magnetic pole sections adjacent to the exciting winding, so that magnetic poles different from each other may appear on the magnetic pole faces of the adjacent two magnetic pole sections, respectively. Exciting currents flowed through the annular windings fitted in the slots of the stator core unit are suitably changed over, so that shifting magnetic fields may be generated on a side of the stator. The thus-generated shifting magnetic fields act as if N and S poles move at a predetermined speed from one side in the axial direction to the other side in the axial direction or from the other side to the one side. The shifting magnetic field corresponds to a rotating magnetic field used in a multi-phase synchronous motor. The shifting magnetic fields permit thrust to be generated between the magnetic pole sections of the stator core unit and the permanent magnet train, resulting in the direct-acting shaft being moved in the axial direction. When a magnetic pole appearing on the magnetic pole face of each of the magnetic pole sections of the stator core is rendered constant, the movable element is fixed because only suction force occurs between the movable element and the stator.

In the present invention, the stator core unit is constituted by combining a plurality of stator core divisions with each other in the axial direction. The stator core divisions are provided with combination structures in a manner to be positioned at portions of the yoke corresponding to the slots of the stator core unit. The combination structures are constructed so as to be combined with each other in the axial direction. The portion of the yoke corresponding to the slot indicates a portion of the yoke at which the slot is divided into two or a portion thereof at which the slot cannot maintain its configuration, when two stator core divisions are separated from each other. Thus, it is not limited to a portion of the yoke at which the slot is fully divided into two halves of the same configuration.

The combination structure may be constructed in any desired manner which has been conventionally known in the art. For example, a projection/recess fit structure may be employed for this purpose. Alternatively, the combination structure may be so configured that each adjacent two stator core divisions each are formed at a portion thereof opposite to a yoke constituting section with a recess or a slit and a fit member common to the recesses or slits of the two stator core divisions is fitted therein.

When one such stator core unit is arranged, the stator core divisions each may include an annular yoke constituting section arranged so as to be concentric with the direct-acting shaft and an annular magnetic pole section constructed so as to be integral with the yoke constituting section. The stator core unit is preferably formed of a magnetically conductive material.

When a plurality of the stator core units are incorporated in the motor, they are arranged so as to be spaced from each other at predetermined angular intervals in a peripheral direction of the direct-acting shaft. The stator core divisions constituting each of the stator core units each include one such magnetic pole section and a yoke constituting section constituting a part of the yoke. The stator core divisions each are preferably formed by laminating a plurality of silicon steel sheets on each other.

Such formation of the stator core unit by a combination of the plural stator core divisions with each other in the axial direction permits a length of the stator core unit to be optionally determined depending on the number of stator core divisions and a configuration thereof. Thus, when it is desired to increase the number of phases of the exciting currents or increase a length of the permanent magnet train, to thereby obtain thrust at an increased magnitude, it is not required to newly design and manufacture the stator core unit. Also, the annular winding can be arranged at a part thereof in the slot during assembling of the stator core divisions, so that a combination between the stator core units and the annular windings is facilitated, resulting in assembling of the stator being facilitated. Further, the annular winding is interposed at a part thereof between each adjacent two stator core units, so that the annular winding may be effectively received at a part thereof in the slot even when a width of an opening of the slot in the axial direction on a side of the movable element is reduced. In addition, such construction permits a space factor of the annular winding in the slot to be increased as compared with forcing of the annular winding into the slot which is carried out in the prior art.

When a plurality of the stator core units are arranged, the stator core divisions each may be formed by laminating a plurality of silicon steel sheets on each other. The yoke constituting section of each of the stator core divisions is formed on an end surface thereof combined with each of other stator core divisions with a slit which is open in the peripheral direction and on one side of the axial direction. Two such slits formed on each adjacent two of the stator core divisions are aligned with each other while keeping each two of the stator core divisions combined with each other. The two slits thus aligned with each other are fitted therein with a strip-like member for positioning. Such construction permits a combination between each adjacent two stator core divisions to be smoothly attained, to thereby enhance workability in the assembling.

The strip-like linear member may be constituted by a part of a metal ring member. The ring member is used also as a strip-like member for the stator core units arranged in the peripheral direction. This permits assembling of the stator to be facilitated.

Also, the present invention may be so constructed that of the stator core divisions, two end-side stator core divisions positioned on both sides in the axial direction are formed into the same configuration wherein the yoke constituting section is formed with one such slit and one or more of the other stator core divisions interposed between the two end-side stator core divisions are formed into the same configuration wherein the yoke constituting section is formed with two such slits. This permits a reduction in manufacturing cost of the motor.

In a preferred embodiment of the present invention, the movable element is arranged so as to be slid in the stator. The stator is securely fitted in a frame formed therein with a stator fit. The stator fit hole is formed into a cylindrical shape. The stator core units each are formed so as to be fitted in the cylindrical stator fit hole.

The magnetic pole face of the magnetic pole section is formed with at least one pseudo-slit which is open to the movable element. The pseudo-slit functions to reduce cogging torque.

BRIEF DESCRIPTION OF THE DRAWINGS

These and other objects and many of the attendant advantages of the present invention will be readily appreciated as the same becomes better understood by reference to the following detailed description when considered in connection with the accompanying drawing; wherein.

DETAILED DESCRIPTION OF THE PREFERRED EMBODIMENTS

Now, a cylinder-type linear synchronous motor according to the present invention will be described hereinafter with reference to the accompanying drawings.

Figure 1:
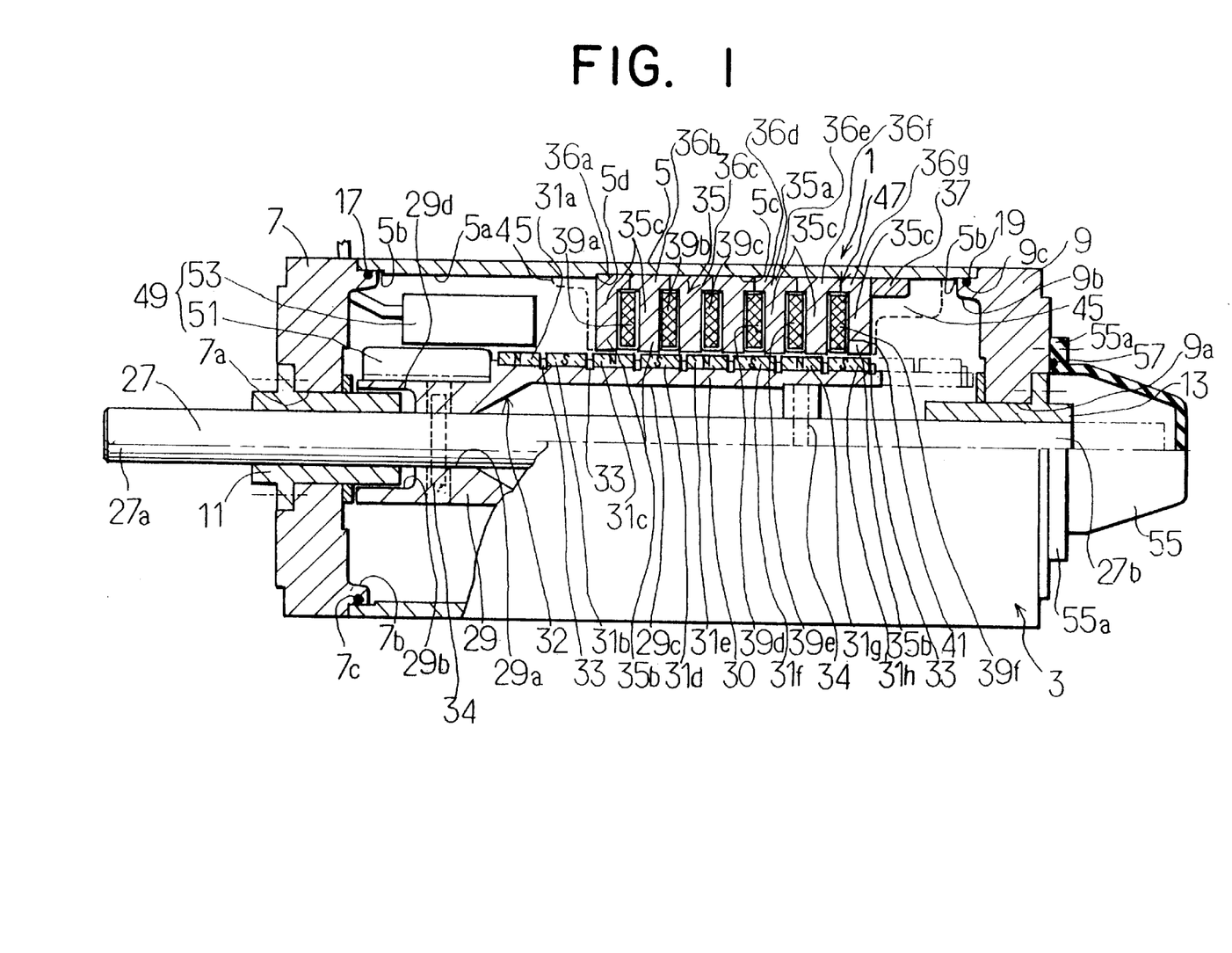
FIG. 1 is a partially sectional view showing an embodiment of a cylinder-type linear synchronous motor according to the present invention, which is applied to a cylinder-type linear three-phase synchronous motor.
Figure 2:
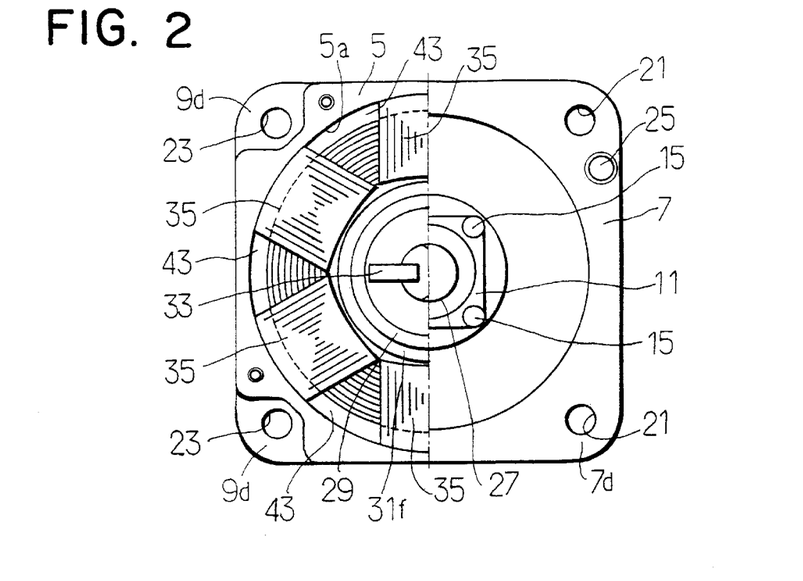
FIG. 2 is a plan view of the cylinder-type linear three-phase synchronous motor shown in FIG. 1, of which a half is sectioned.

Referring first to FIGS. 1 and 2, an embodiment of a cylinder-type linear synchronous motor according to the present invention is illustrated, which is practiced in the form of a cylinder-type linear three-phase synchronous motor. A cylinder-type linear three-phase synchronous motor of the illustrated embodiment generally designated at reference numeral 1 includes a casing 3, which is constituted by a cylinder-like hollow frame 5 made of a non-magnetic material such as, for example, aluminum and a pair of end brackets 7 and 9 made of aluminum. The frame 5 is formed thereof with a cavity 5a of a cylindrical shape. Also, the frame 5 is formed on an inner surface of both ends thereof with annular steps 5b in which the end brackets 7 and 9 are fitted. The end brackets 7 and 9 are formed with through-holes 7a and 9a, in which linear bearings 11 and 13 each constituted by a ball spline are fitted, respectively. The linear bearings 11 and 13 are fixed in the end brackets 7 and 9 by means of four screws 15, respectively. The end brackets 7 and 9 include projections 7b and 9b fitted in the steps 5b of the frame 5, respectively. The projections 7b and 9b are formed on an outer peripheral portion thereof with annular grooves 7c and 9c which are open outwardly in a radial direction thereof, respectively. The grooves 7c and 9c have O-rings 17 and 19 for sealing received therein, respectively. The end brackets 7 and 9, as shown in FIG. 2, are integrally provided thereon with flanges 7d and 9d of a substantially square configuration, respectively. The flanges 7d and 9d are formed at corners thereof with bolt insertion holes 21 and 23, respectively. The end brackets 7 and 9 are fixed on the frame 5 by means of screws 25.

The cylinder-type linear synchronous motor of the illustrated embodiment also includes a direct-acting shaft 27 supported in the linear bearings 11 and 13 so as to be linearly reciprocated. The direct-acting shaft 27 is made of iron. The direct-acting shaft 27 includes an output shaft section 27a to which a load is connected. In FIG. 1, the output shaft section 27a is shown to be outwardly projected to the utmost. The direct-acting shaft 27 is fixedly mounted on a portion positioned in the casing 3 with a magnet mount 29 in a manner to be concentric with the direct-acting shaft 27. The magnet mount 29 is made of a magnetic material such as iron or the like. The magnet mount 29 is essentially formed into a cylindrical shape and is formed therein with a fit hole 29a through which the direct-acting shaft 27 is fitted in the magnet mount 29, as well as first and second large-diameter holes 29b and 29c. The first and second large-diameter holes 29b and 29c are formed into a diameter larger than that of the fit hole 29a and positioned on both sides of the fit hole 29a. The first large-diameter hole 29b is formed into a diameter which prevents the first large-diameter hole 29b from contacting with an outer peripheral surface of an inner end of the linear bearing 11 and the second large-diameter hole 29c is formed into a diameter which prevents the second large-diameter hole 29c from contacting with an outer peripheral surface of the linear bearing 13. The magnet mount 29 is formed on an outer peripheral surface of a portion thereof at which the first large-diameter hole 29c is arranged or on an end thereof facing the output shaft section 27a of the direct-acting shaft 27 with a step 29d, on which a linear scale acting as a detected section 51 of a position detection sensor described hereinafter is mounted. The magnet mount 29 acts at an outer periphery of a portion thereof at which the second large-diameter hole 29c is formed as a magnet mounting section 30. The magnet mounting section 30 is formed into a substantially cylindrical shape so as to extend in an axial direction of the direct-acting shaft. The magnet mounting section 30 is fitted thereon with eight annular permanent magnets 31a to 31h. Between the annular permanent magnets adjacent to each other and on an outside of the annular permanent magnet 31h are fitted substantially annular or C-shaped stopper members 33, each of which is made of a non-magnetic material and cut at a part thereof.

The magnet mounting section 30 is formed on an outer periphery thereof with fit grooves in which the stopper members 33 are fitted. The annular permanent magnets 31a to 31h may be fixed on the magnet mounting section 30 by means of an adhesive. Alternatively, the annular permanent magnets 31a to 31h may be formed together by molding of synthetic resin. Also, the magnet mounting section 30 on which the annular permanent magnets 31a to 31h are fitted may be covered with a heat-shrinkable tube, which is then heated for heat shrinkage, resulting in the annular permanent magnets 31a to 31h being wholly wrapped in the tube thus heat-shrunk. The annular permanent magnets 31a, 31c, 31e and 31g each are so magnetized that an N pole appears on an outer surface thereof defined in a radial direction thereof, whereas the annular permanent magnets 31b, 31d, 31f and 31f each are so magnetized that an S pole appears on an outer surface thereof defined in a radial direction thereof. This results in an array of the permanent magnets in which the N poles and S poles alternately arranged in an axial direction of the direct-acting shaft 27. The annular permanent magnets act at portions thereof opposite to seven magnetic pole sections of six stator core units 35 described hereinafter as a plurality of permanent magnets which constitute a plurality of permanent magnet trains arranged so as to be spaced from each other at predetermined intervals in a peripheral direction of the motor. In the illustrated embodiment, the direct-acting shaft 27, magnet mount 29 and annular permanent magnets 31a to 31h cooperate with each other to constitute a movable element 32.

Mounting of the magnet mount 29 on the direct-acting shaft 27 may be carried out in any desired manner. In the illustrated embodiment, for this purpose, the direct-acting shaft 27 is provided at each of two portions thereof with four fit holes in a manner to be arranged in the peripheral direction, in which pins 34 are fitted, resulting in the magnet mount 29 being fixed on the direct-acting shaft 27.

The frame 5 is securely mounted on an inner peripheral portion thereof with the six stator core units 35 briefly described above. The six stator core units 35 include bases or yokes 35a fixed on the inner peripheral side of the frame 5 and seven magnetic pole sections 35c of which magnetic pole faces 35b are opposite to the permanent magnet trains constituted by the annular permanent magnets 31a to 31h in the radial direction of the direct-acting shaft 27 and which are spaced from each other at predetermined intervals in the axial direction of the direct-acting shaft 27. The stator core units 35 are arranged at substantially equal intervals in a peripheral direction thereof so that the magnetic pole faces 35b are opposite to the permanent magnet trains of the movable elements. In the illustrated embodiment, the stator core units 35 are arranged so as to be spaced from each other at angular intervals of 60 degrees.

The stator core units 35 each are constituted by seven stator core divisions 36a to 36g combined with each other in the axial direction. The stator core divisions 36a to 36g include combination structures which are separable from each other in the axial direction and are positioned at portions of the yokes 35a of the stator core units 35 each corresponding to a central portion of a slot thereof. The stator core divisions 36a to 36g each include each magnetic pole section 35c and a yoke constituting section which constitutes a part of the yoke 35a. Mating faces of each adjacent two of the stator core divisions which are opposite to each other are formed thereon with a recess and a projection which are combined with each other to constitute the combination structure. Thus, the stator core divisions adjacent to each other are connected to each other through the combination structures thus provided. The stator core divisions 36a to 36g each are made by laminating a plurality of silicon steel sheets on each other. In the illustrated embodiment, the silicon steel sheets are laminated together in the peripheral or circumferential direction of the direct-acting shaft 27, to thereby constitute each of the stator core divisions 36a to 36g. Also, in the illustrated embodiment, lamination of the silicon steel sheets is carried out in a manner to gradually shift the steel sheets from each other, resulting in the magnetic pole face approaching an arc as much as possible or being curved. Of the stator core divisions 36a to 36g, the stator core divisions 36a and 36g positioned on both end sides in the axial direction are formed into the same configuration. The remaining five stator core divisions 36b to 36e arranged between the end-side stator core divisions 36a and 36b are formed into the same configuration.

A structure for securing the base or yoke 35a of each of the stator core units 35 on the inner periphery of the frame 5 may be configured in any desired manner. In the illustrated embodiment, the frame 5 is formed on the inner periphery thereof with six fit grooves 5c in equal intervals in the peripheral direction of the frame 5, which permit the stator core units 35 to be inserted into the frame 5 from one open end of the frame 5 or the open end thereof on a side of the end bracket 9. The fit grooves 5c each are provided at a portion thereof on a side of the other open end of the frame 5 or the open end thereof on a side of the end bracket 7 with a stopper face 5d. The stopper faces 5d each function to contact with an end surface of each of the stator core units 35 in the axial direction to position the stator core unit in the frame 5. The yoke 35a of each of the stator core units 35 is press-fitted in each of the fit grooves 5c. Reference numeral 37 designates an annular stopper, which is securely arranged on the inner periphery of the frame 5 so as to be contacted with the other end surface of the stator core unit 35 in the axial direction while keeping the one end surface of the stator core units 35 in the axial direction contacted with the stopper face 5d. The stopper member 37 is securely fixed in the frame 5 by screwing.

Figure 3:
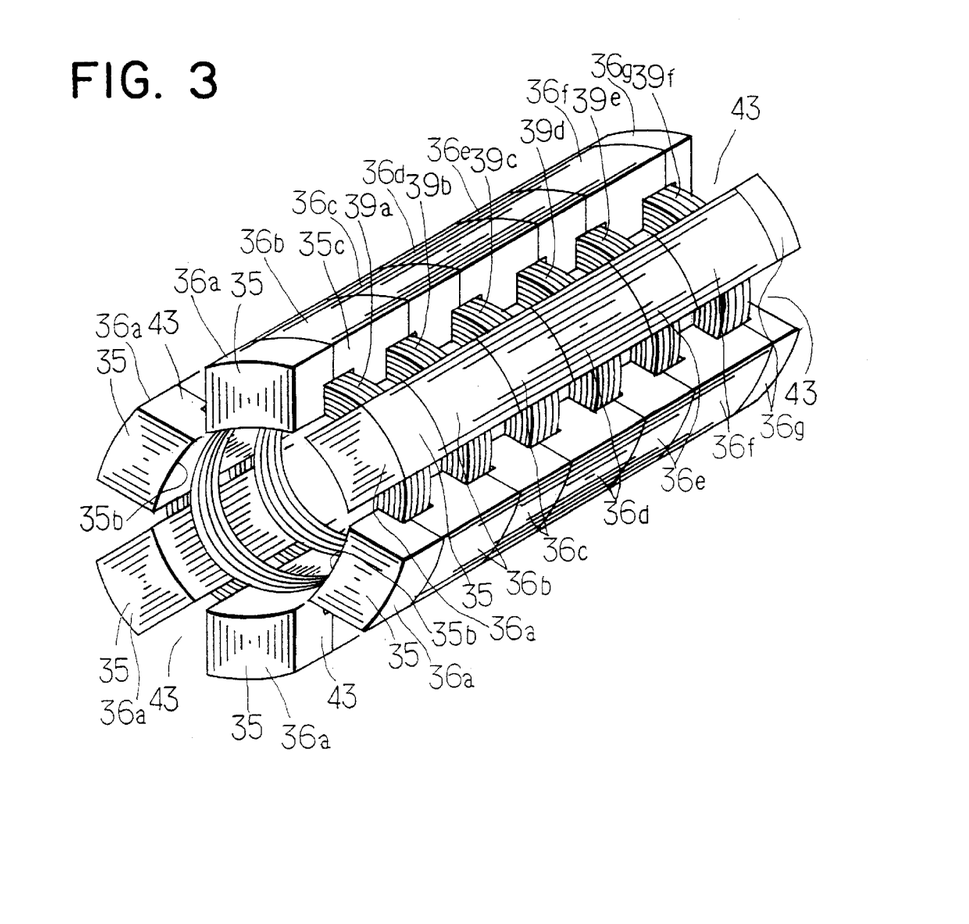
FIG. 3 is a schematic perspective view showing a stator incorporated in the cylinder-type linear three-phase synchronous motor shown in FIG. 1.
Figure 4A:
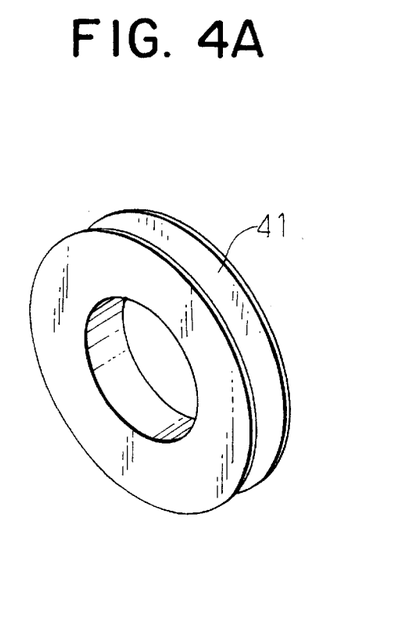
FIG. 4A is a perspective view showing a bobbin.
Figure 4B:
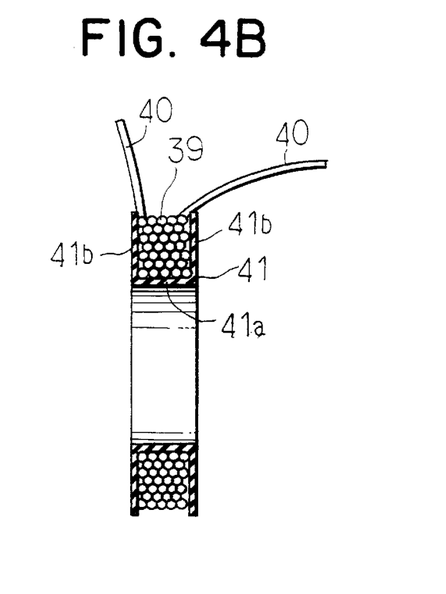
FIG. 4B is a sectional view of the bobbin shown in FIG. 4A on which an annular winding is mounted.

Six such slots defined between the magnetic pole sections 35c of the stator core units 35 adjacent to each other each are fitted therein with a part of each of annular windings 39a to 39f each formed by annularly winding a wire conductor or conductive wire so as to constitute an excitation winding. In the illustrated embodiment, as shown in FIG. 1, the annular windings 39a to 39f each are constructed by winding the conductive wire on each of bobbins 41 made of a synthetic resin material as shown in FIGS. 4A and 4B. Each of the annular windings is fitted in each of the slots together with a part of the bobbin 41. The bobbin 41 is omitted from FIGS. 2 and 3 for the sake of brevity. The bobbins 41 each include a cylinder 41a and two flanges 41b mounted on both ends of the cylinder 41a. Between the flanges 41b is wound a wire conductor or conductive wire 39 to constitute each of the annular windings. In FIG. 4B, reference numeral 40 designates a lead-out wire of the annular winding. As shown in FIGS. 2 and 3, six spaces 43 are defined in the peripheral direction between the stator core units 35 adjacent to each other. The lead-out wire 40 led out of each of the annular windings 39a to 39f is drawn around in the space 43, to thereby be connected to a feeder or the lead-out wire of the annular winding selected. Arrangement of the bobbins is not necessarily required, however, it permits workability and insulation to be highly increased.

The annular windings 39a to 39f are fitted in order between the stator core divisions 36a to 36g adjacent to each other when the stator core divisions 36a to 36g are combined together to assemble the six stator core units 35. More particularly, in order to assemble the six stator core units 35, the six stator core divisions 36a are arranged in an annular manner on a fixture for assembling while being spaced from each other at predetermined intervals in the peripheral direction and then the annular winding 39a is arranged thereon. Then, the next six stator core divisions 36b are arranged on the six stator core divisions 36a thus assembled while interposing the annular winding 39a therebetween. Subsequently, the annular windings 39b to 39f and the respective six stator core divisions 36c to 36g are likewise put on each other in order, resulting in the six stator core units 35 being assembled. Lastly, laser is irradiated on joints between the stator core divisions 36a to 36g to integrate the stator core divisions with each other.

In the illustrated embodiment, the stator core units 35, annular windings 39a to 39f and stopper 37 may be insert-molded by an insulating molding material, resulting in a mold section 45 being formed. In FIG. 1, the mold section 45 is indicated at broken lines. The stopper face 5d and stopper member 37 function to receive reaction force acting on the stator core units 35 in the axial direction to prevent displacement of the stator core units 35 in the axial direction. This prevents cracking or breaking of the mold section 45 due to application of force to the mold section 45. In the illustrated embodiment, the stator core units 35 and annular windings 39a to 39f cooperate with each other to constitute a stator 47.

Unlike a stepping motor, the linear synchronous motor requires a position detecting sensor for detecting positional relationship between the movable element 32 and the stator 47 in the axial direction in order to change over an exciting current flowing through each of the annular windings 39a to 39f. It would be considered to arrange the position detecting sensor so as to detect displacement of the direct-acting shaft 27 outwardly projecting from the casing. However, such arrangement is inconvenient because it fails to permit the linear synchronous motor to be handled like the conventional motor. Also, it leads to an increase in detection error by thermal expansion of the members due to a variation in temperature, to thereby deteriorate accuracy of positional control. Thus, in the illustrated embodiment, a position detecting sensor 49 is arranged in the frame 5 so as to detect positional relationship between the movable element 32 and the stator 47 in the axial direction as shown in FIG. 1. The position detecting sensor 49 is constituted by the detected section 51 briefly described above which is mounted on the movable element 32 so as to be optically or magnetically detected and a detecting section 53 fixed on the inner periphery of the frame 5 so as to detect position or displacement of the detected section 51. When the position detecting sensor 49 is configured to optically detect the positional relationship, a linear scale including a predetermined reflection pattern may be used as the detected section 51. Also, in this instance, the detecting section 53 includes a light emitter and a light receptor. Thus, the position detecting sensor 49 detects the positional relationship depending on information or data contained in light reflected from the detecting section 53 to the detected section 51. In the illustrated embodiment, the magnet mount 29 of the movable element 32 and the frame 5 are made of materials different in thermal expansion coefficient from each other, respectively. Thus, the detected section 51 of the position detecting sensor 49 is arranged in proximity to the output shaft section 27a of the direct-acting shaft 27 to which a load for the direct-acting shaft 27 is connected and the detecting section 53 is likewise positioned in proximity to the output shaft section 27a. When heat transmitted from the load through the output shaft section 27a of the direct-acting shaft 27 is then transmitted through the direct-acting shaft 27 into the casing 3 of the motor 1, the direct-acting shaft 27, magnet mount 29 and frame 5 are caused to be thermally expanded. On the contrary, if the position detecting sensor 49 is arranged on a side of a non-output shaft section 27b of the direct-acting shaft 27 opposite to the output shaft section 27a, expansion of the members arranged between the output shaft section 27a and the non-output shaft section 27b is accumulated, resulting in indicating a variation in mounting position of each of the detected section 51 and detecting section 53. On the contrary, positioning of the detected section 51 and detecting section of the position detecting sensor 49 in proximity to the output shaft section 27a of the direct-acting shaft 27 in the illustrated embodiment minimizes accumulation of thermal expansion which causes the mounting positions of the detected section 51 and detecting section 53 to be varied, so that the position detecting sensor 49 may be increased in detection accuracy, resulting in positioning accuracy of the linear synchronous motor being increased correspondingly.

In the illustrated embodiment, as shown in FIG. 1, the end bracket 9 on which the linear bearing 13 for supporting the end of the non-output shaft section 27b of the direct-acting shaft 27 to which the load is not connected is provided is mounted thereon with a cover member 55, which is made of a metal material or synthetic resin material and arranged so as to cover the end of the non-output shaft section 27b of the direct-acting shaft 27 projecting from the end bracket 9. The cover member 55 functions to protect the non-output shaft 27b of the directacting shaft 27 and the linear bearing 13. In particular, in the illustrated embodiment, the cover member 55 is configured so as to exhibit waterproofness. More particularly, the cover member 55 includes a flange 55a, which is formed with an annular fit groove open in a direction toward an outer surface of the end bracket 9. Also, the cover member 55 includes an O-ring 57 for sealing fitted in the annular fit groove while being compressed. The cover member 55 is fixed on the end bracket 9 by threadedly inserting a plurality of screws into a plurality of through-holes (not shown) formed via the flange 55a, respectively. Such construction functions to prevent intrusion of water into the motor through the non-output shaft section 27b of the direct-acting shaft 27. The function is advantageous when the linear three-phase synchronous motor 1 is operated in a manner to shift the direct-acting shaft 27 in a vertical direction while keeping the non-output shaft section 27b of the direct-acting shaft 27 upwardly positioned.

In the cylinder-type linear synchronous motor, shifting magnetic fields are generated by varying a direction of exciting currents fed through the annular windings 39a to 39f of the stator 47 to vary polarities of magnetic poles appearing on the magnetic pole faces 35b of the magnetic pole sections 35c of the stator core units 35, so that thrust which acts to shift the direct-acting shaft 27 in the axial direction may be generated between the permanent magnet trains of the movable element 32 and the magnetic pole sections 35c of the stator 47. In the illustrated embodiment, a three-phase AC current of a sinusoidal wave may be used as the exciting current. A magnetic pole appearing on the magnetic pole face 35b of each of the magnetic pole sections 35c is varied depending on a frequency of the three-phase AC current. Feeding of a multi-phase AC current to each of the annular windings permits the motor to act as a multi-phase synchronous motor, resulting in thrust at an increased magnitude being obtained. When the exciting current is kept unvaried or a polarity of the current and a magnitude thereof are kept fixed, only suction force is permitted to act between the stator 47 and the movable element 32, so that a position of the movable element 32 may be fixed.

Figure 5:
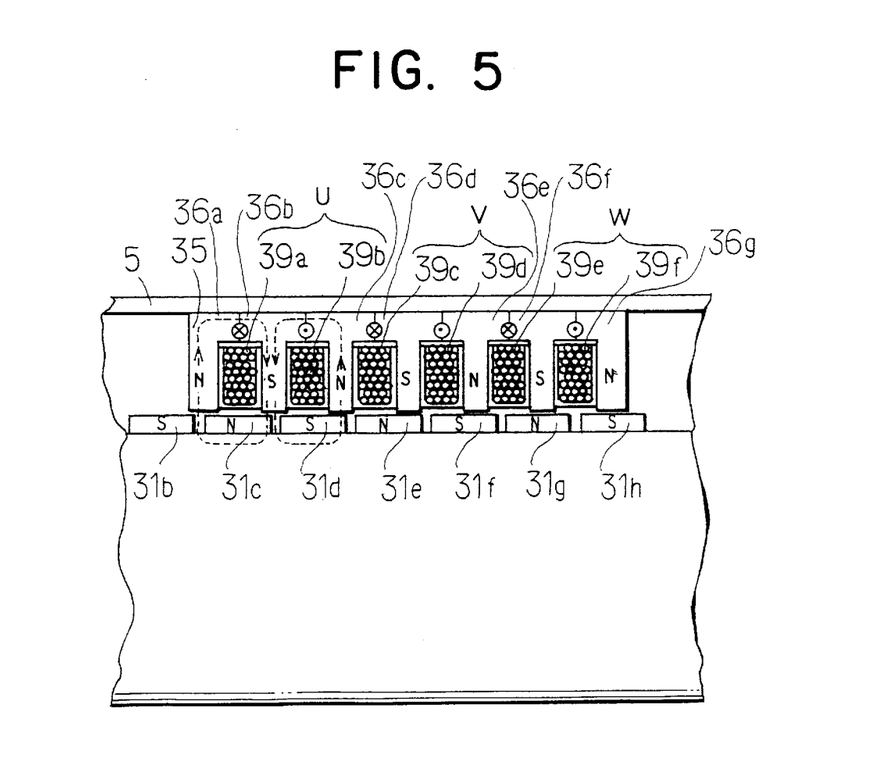
FIG. 5 is a fragmentary view showing arrangement of annular windings on a side of a stator incorporated in the cylinder-type linear three-phase synchronous motor of FIG. 1.
Figure 6:
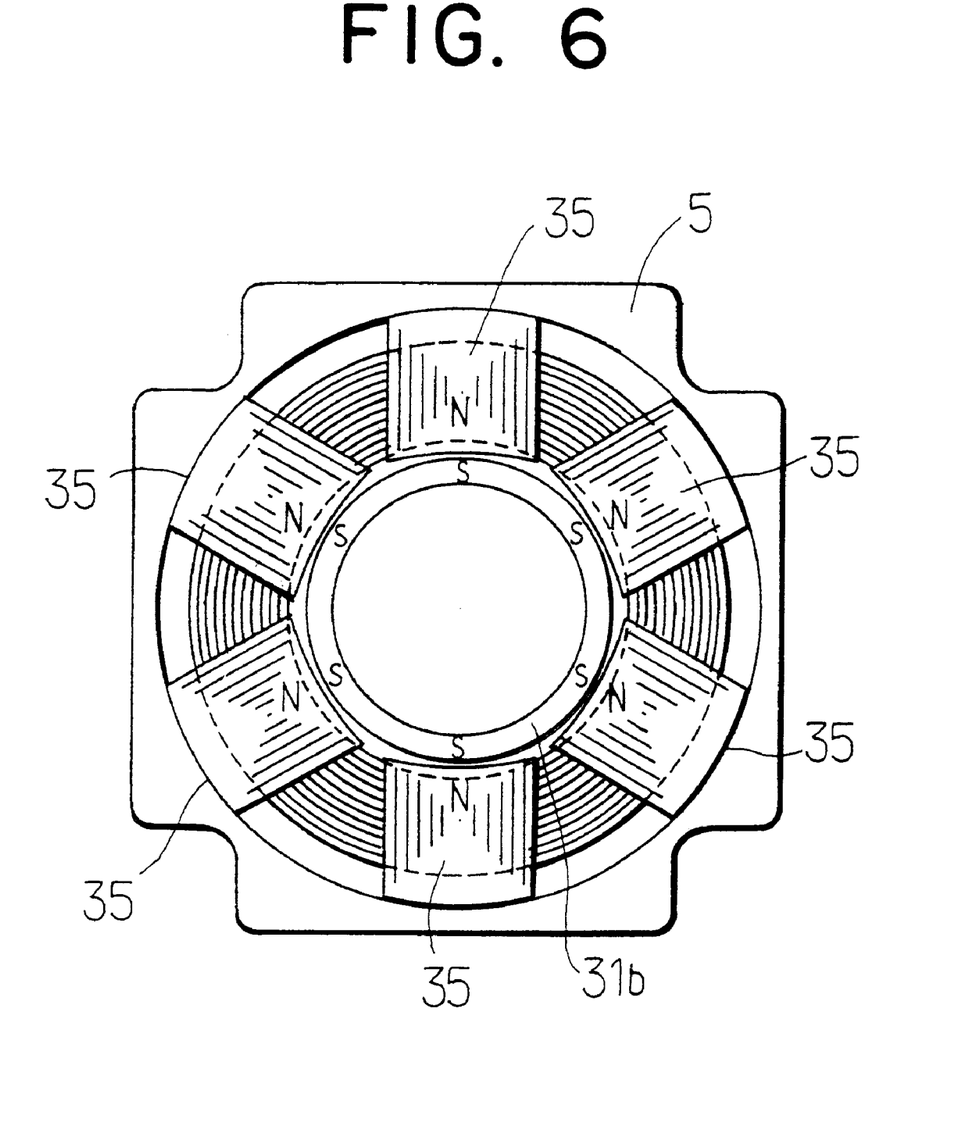
FIG. 6 is a schematic view showing relationship between a stator and a movable element in the cylinder-type linear three-phase synchronous motor shown in FIG. 1.

Now, the manner of excitation of the annular windings 39a to 39f will be briefly described with reference to FIGS. 5 and 6. The illustrated embodiment uses exciting currents of three U, V and W phases which have phase angles shifted by 120 degrees from each other, respectively. Also, the annular windings 39a and 39b fitted in adjacent two of the slots of the stator core units 35 have the exciting current of the U phase flowed therethrough. The annular windings 39c and 39d have the exciting current of the V phase flowed therethrough and the annular windings 39e and 39f have that of the W phase flowed therethrough. Further, six such annular windings 39a to 39f are connected to each other so that polarities appearing on the respective axially adjacent two magnetic pole sections 35c of the six stator core units 35 are different from each other. In the illustrated embodiment, in order to obtain flowing of a magnetic flux shown in FIG. 5, leadout wires of the annular windings 39a and 39b through which the exciting current of the U phase is flowed are connected to each other so as to permit a direction in which the current flows through the annular winding 39a and that in which it flows through the annular winding 39b to be rendered opposite to each other as indicated at arrows of broken lines in FIG. 5. The lead-out wires thus connected are then connected to a U-phase feeder. Likewise, connection of lead-out wires of the annular windings 39c and 39d is carried out so that a direction of the V-phase current flowing through the annular winding 39c and that flowing through the annular winding 39d are rendered opposite to each other. Then, the lead-out wires are connected to a V-phase feeder. This is likewise true of lead-out wires of the annular windings 39e and 39f.

Then, when the exciting current flowing through each of the annular windings is changed over depending on an output of the position detecting sensor 49, to thereby permit a shifting magnetic field apparently shifting in the axial direction to be generated, the movable element 32 is moved in the axial direction based on the substantially the same operational principle as that in a synchronous motor. When changing-over of the exciting current is stopped, only suction force acts between the movable element 32 and the stator 47, resulting in movement of the movable element 32 being stopped.

Now, the manner of excitation carried out in the illustrated embodiment will be generally described. First, when stator core units of m (m: a positive integer of 2 or more) in number are used in the case of obtaining shifting magnetic fields by flowing exciting currents of p phases (p: a positive integer of 2 or more) different in phase angle through a plurality of annular windings, the stator core units are arranged so as to be spaced from each other at equal intervals in the peripheral direction. Also, annular windings of pxq (q: a positive integer of 1 or more) in number are prepared. Supposing that each of the stator core units is provided with magnetic pole sections of n in number, relationship of n=pxq+1 is obtained. Each of the annular windings is fitted at a part thereof in each of n−1 slots formed between the respective axially adjacent two of the m stator core units. Such construction permits shifting magnetic fields which are fully synchronous with each other to be generated from the n magnetic pole sections of the m stator core units. Thus, it is merely required to fit the annular windings in the slots, so that the stator may be readily configured even when a dimension of the slot in the axial direction or an interval between each adjacent two magnetic pole sections is reduced. When multi-phase exciting currents are used to increase thrust, an exciting current of the same phase is flowed through the annular windings of q in number fitted in the q slots of the m stator core units successively arranged in the axial direction. At this time, the annular windings of pxq in number are connected together so that polarities appearing on the respective axially adjacent two magnetic pole sections of the m stator core units are rendered different from each other. This prevents wiring from being complicated. A variation in thrust may be attained by varying the number of annular windings through which an exciting current of the same phase is flowed.

Figure 7:
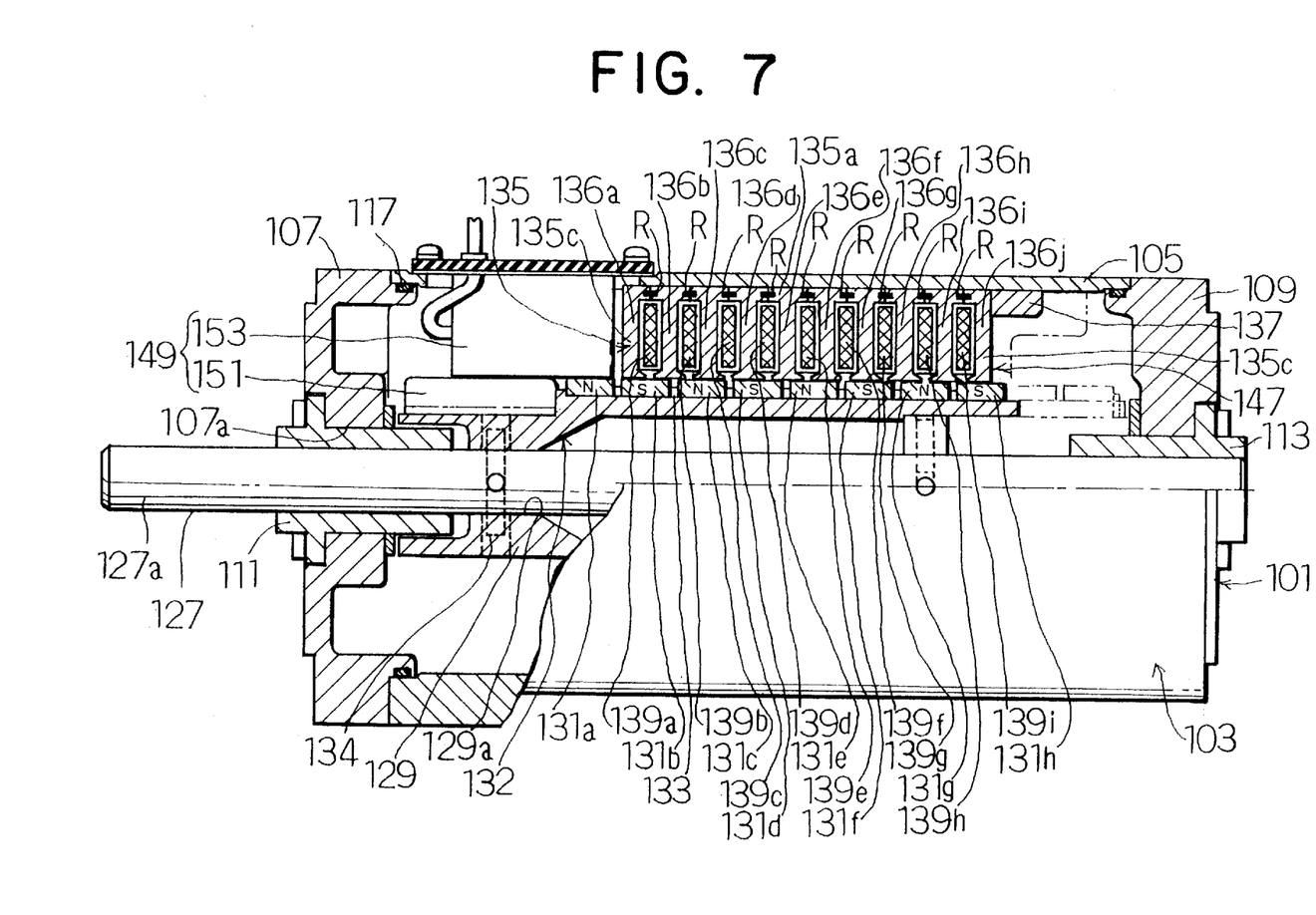
FIG. 7 is a partially sectional view showing another embodiment of a cylinder-type linear synchronous motor according to the present invention, which is applied to a cylinder-type linear synchronous motor constructed so as to exhibit thrust at an increased magnitude as compared with the cylinder-type linear three-phase synchronous motor shown in FIG. 1.

Referring now to FIG. 7, another embodiment of a cylinder-type linear synchronous motor according to the present invention is illustrated, which is applied to a linear synchronous motor increased in thrust as compared with the motor shown in FIG. 1. In connection with this embodiment, reference numerals correspond to those discussed in the embodiment described above, except with an additional prefix of 100. In a cylinder-type linear synchronous motor of the illustrated embodiment, three annular windings are arranged for each of phases. This results in each of stator core units 135 having ten magnetic pole sections 135c and nine annular windings 139a. Also, stator core divisions 136a to 136j constituting each of the stator core units 135 are formed into a configuration different from those in the embodiment described above. Further, the illustrated embodiment includes combination structures for connecting the stator core divisions 136a to 136j to each other which are configured in a manner different from those in the above-described embodiment. The remaining part of the illustrated embodiment may be constructed in substantially the same manner as the embodiment described above.

Figure 8:
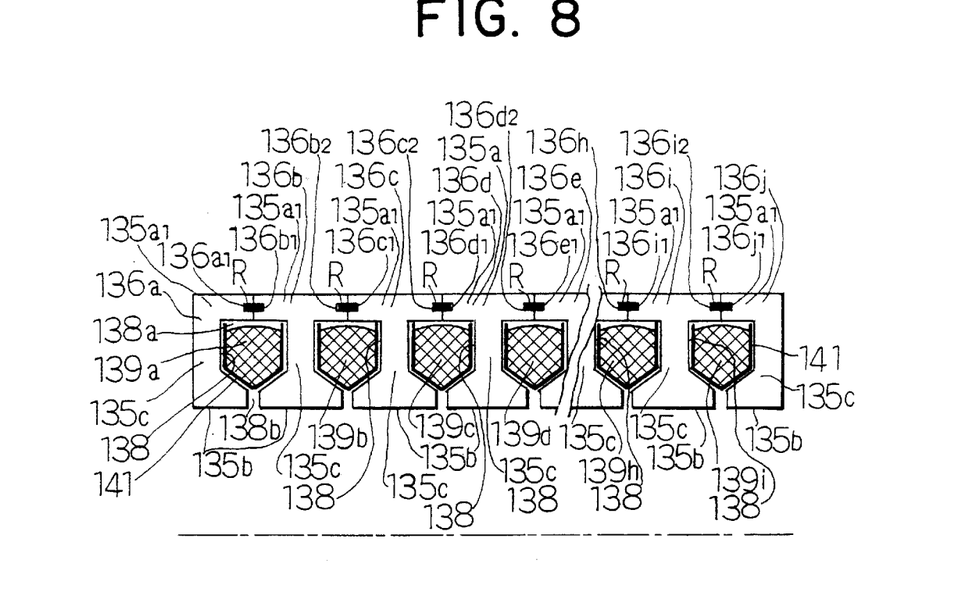
FIG. 8 is a schematic view showing one of stator core units incorporated in the cylinder-type linear synchronous motor shown in FIG. 7.

Now, such differences between the illustrated embodiment and the embodiment described above will be described with reference to FIGS. 8 and 9, wherein for the sake of brevity, FIG. 8 shows only one stator core unit 135 and FIG. 9 shows connection among six such stator core units. The stator core divisions 136a to 136j constituting the stator core unit 135 each include one magnetic pole section 135c and a yoke constituting section 135a1 (FIG. 8) constituting a part of a yoke 135a. The stator core divisions 136a to 136j each are formed by laminating silicon steel sheets on each other. As shown in FIG. 8, a slot 138 is defined between each adjacent two of the stator core divisions 136a to 136j and includes an opening 138b which is open to a movable element and a winding receiving section 138a in which each of annular windings 129a is received at a part thereof. The magnetic pole section 135c of each of the stator core divisions 136a to 136j is enlarged at an end thereof so that a width of the opening 138b of the slot 138 in an axial direction of a direct-acting shaft 127 (a lateral dimension in FIG. 8) is reduced as compared with a width of the winding receiving section 138b in the axial direction. A reduction in width of the opening 138b leads to an increase in area of a magnetic pole face 135b of the magnetic pole section 135c, to thereby provide thrust at a larger magnitude. However, a reduction in width of the opening 138b in the axial direction fails to fit each of the annular windings 139a to 139i in the slot 138 unless a configuration of the present invention that the stator core units 135 each constitute by a combination of the plural stator core divisions 136a to 136j is employed. Thus, it will be noted that the configuration of the stator core unit 135 in the present invention exhibits a highly satisfactory advantage.

Figure 9:
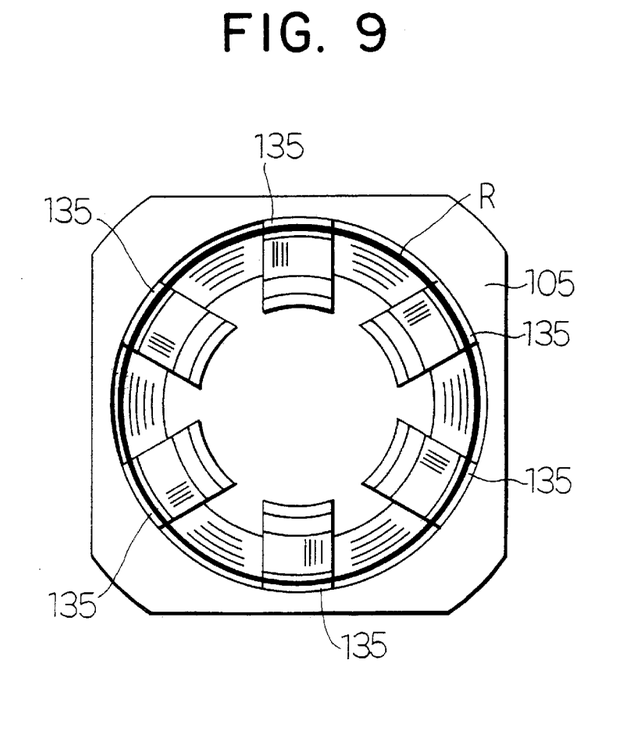
FIG. 9 is a schematic view showing arrangement of stator core units incorporated in the cylinder-type linear synchronous motor shown in FIG. 7.

As shown in FIG. 8, the yoke constituting section 135a1 of each of the stator core divisions 136a to 136j is formed on an end surface thereof opposite to the yoke constituting section 135a1 of each of the stator core divisions adjacent thereto with a slit 136ai (136b1, 136b2, 136i2, 136ji) which is open in a peripheral direction of the direct-acting shaft 127. The slits designated at, for example, 136a1 and 136b1 of each adjacent two stator core divisions designated at, for example, 136a and 136b which are opposite to each other are aligned with each other when the two stator core divisions are combined with each other, resulting in providing each of through-holes. The thus-aligned two slits designated at, for example reference characters 136a1 and 136b1 are fitted therein with a common ring member R. As shown in FIG. 9, the ring members R each are fitted in the thus-aligned two slits of each adjacent two of the stator core divisions arranged in the peripheral direction for constituting the six stator core units 135, resulting in connecting the stator core units 135 to each other. In FIG. 7, nine such ring members R are arranged.

The annular windings 139a to 139i are interposedly arranged between the respective adjacent two of the Stator core divisions 136a to 136j in order when the stator core divisions 136a to 136j are combined together to constitute the six stator core units 135. More specifically, of the respective 10 stator core divisions 136a to 136j constituting the 6 stator core units 135, the six stator core divisions 136a are first arranged at predetermined intervals on an assembling fixture and then the annular winding 139a received in a bobbin 141 is arranged thereon. Then, the next six stator core divisions 136b are arranged on the thus-arranged six stator core divisions 136a while interposing the annular winding 139a between the stator core divisions 136a and 136b. Likewise, the annular windings 139b to 139h and the respective six stator core divisions 136c to 136j are superposed in order, resulting in the six stator core units 135 being concurrently assembled. Lastly, laser is irradiated on joints among the stator core divisions 136a to 136j, to thereby integrate the stator core divisions with each other. Assembling of the stator core units 135 using the ring members R effectively prevents movement of the stator core divisions during the assembling, to thereby facilitate the assembling. Also, it permits predetermined intervals to be kept among the stator core units.

In the illustrated embodiment, of the stator core divisions 136a to 136j constituting the stator core units 135, the stator core divisions 136a and 136j positioned on both sides in the axial direction each are formed into a substantially C-shape so that the single slit 136a1 or 136j1 is formed at the yoke constituting section. The intermediate stator core divisions 136b to 136i arranged between the outermost stator core units 136a and 136j each are formed into a substantially T-shape so as to have two slits, for example, 136b1 and 136b1 formed at the yoke constituting section 135a1. This permits the stator core unit to be formed into any desired length using two kinds of the stator core divisions, leading to a reduction in manufacturing cost.

Figure 10:
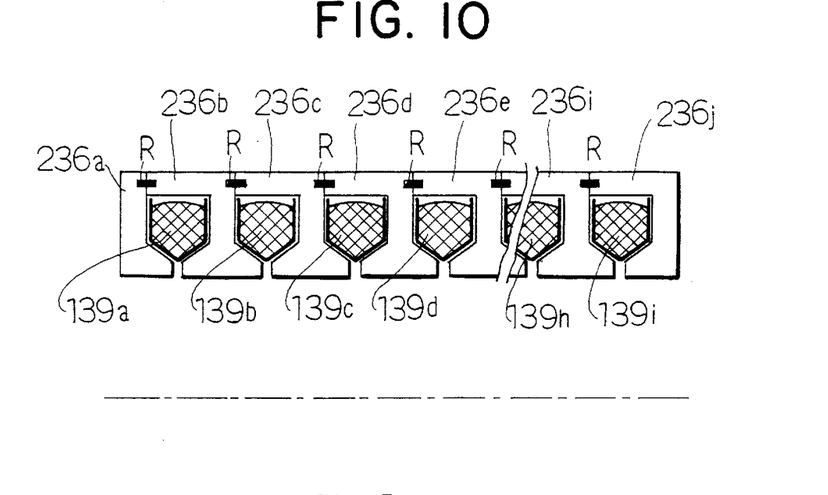
FIG. 10 is a schematic view showing a stator core unit of a desired length which is made using two kinds of stator core divisions.

Referring now to FIG. 10, a further embodiment of a cylinder-type linear synchronous motor according to the present invention is illustrated, which is so constructed that a stator core unit is formed into any desired length using two kinds of stator core divisions. In the illustrated embodiment, a stator core division 236 is formed into a substantially I-shape and remaining stator core divisions each are formed into a substantially inverted L-shape. In the illustrated embodiment, a combination structure for each adjacent two of the stator core divisions is arranged in proximity to a base of a magnetic pole section 236c of one of the two stator core divisions. The remaining part of the illustrated embodiment may be constructed in substantially the same manner as the embodiment shown in FIGS. 7 and 8.

In each of the embodiments described above, the annular permanent magnets 31a to 31h or 131a to 131h are incorporated. Alternatively, the permanent magnet trains arranged in correspondence to the stator core units 35 or 135 each may be constituted by a plurality of permanent magnets independent from each other. In this instance, the permanent magnet trains are arranged so as to be spaced from each other in the peripheral direction of the movable element.

In each of the embodiments, the movable element is constructed in such a manner that the magnetic pole face of each of the permanent magnets is formed into an arcuate shape so as to permit the magnet mount of the movable element to be configured into a substantially circular shape in section while keeping the permanent magnets mounted thereon. Such construction permits parts for the movable element and stator to be manufactured using a facility for manufacturing a rotary motor, leading to a reduction in manufacturing cost of the synchronous motor of the present invention. However, the construction causes a size of a gap between the magnetic pole face 35b or 135b of each of the magnetic pole sections 35c or 135c of the stator core units 35 or 135 and a magnetic pole face of each of the permanent magnets to be varied. In order to eliminate such a disadvantage, the present invention may be so constructed the magnetic face of each of the magnetic pole sections is flat and a flat-type magnet is used as each of the permanent magnets constituting the permanent magnet train mounted on the magnet mounting section of the magnet mount. Such construction permits the gap between the magnet pole face of the permanent magnet and that of the magnetic pole section to be substantially constant. This substantially eliminates a variation in dimension of a gap between a magnetic pole face of the stator and that of the movable element, resulting in providing thrust at an increased magnitude and preventing generation of torque sufficient to rotate the direct-acting shaft. Thus, the present invention prevents application of biased force to the linear bearings, to thereby enhance durability thereof. Such construction causes the magnet mount of the movable element which is mounted thereon with the permanent magnets to have a rectangular shape in section, resulting in the cylinder-type linear synchronous motor having a rectangular shape.

Figure 11:
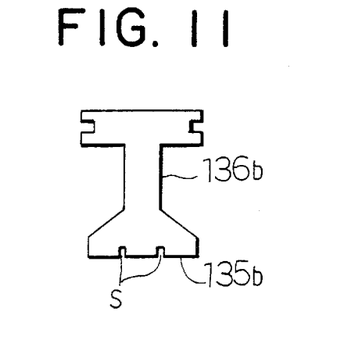
FIG. 11 is a plan view showing a stator core division provided with pseudo-slots.

In each of the embodiments described above, the magnetic pole face 35b or 135b of the magnetic pole section 35 or 135 is formed to be flat. Alternatively, the magnetic pole face 135b may be formed thereon with a plurality of pseudo-slots S.

In each of the above-described embodiments, the six stator core units 35 or 135 are arranged at substantially equal intervals in the peripheral direction. However, theoretically, only one such stator core unit may be arranged. Nevertheless, arrangement of one such stator core unit 35 or 135 constructed as described above causes suction force acting between the movable element and the stator to biasedly apply force to the direct-acting shaft on one side in a radial direction of the shaft, resulting in the force ultimately acting on the linear bearings, leading to a reduction in durability thereof. Thus, it is desirable that a plurality of the stator core units are arranged while keeping satisfactory magnetic balance among the stator core units. Also, an increase in the number of stator core units 35 or 135 permits synthesized thrust to be increased correspondingly. Thus, the number of stator core units 35 to be arranged may be determined depending on a magnitude of thrust to be provided.

Figure 12:
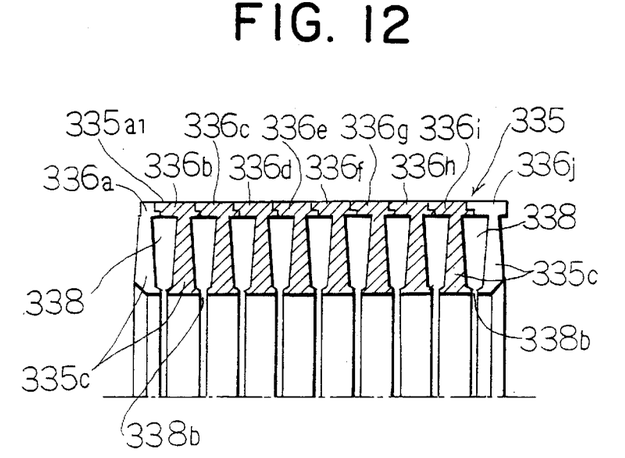
FIG. 12 is a half-sectional view showing a stator core constituted of a single stator core unit.
Figure 13:
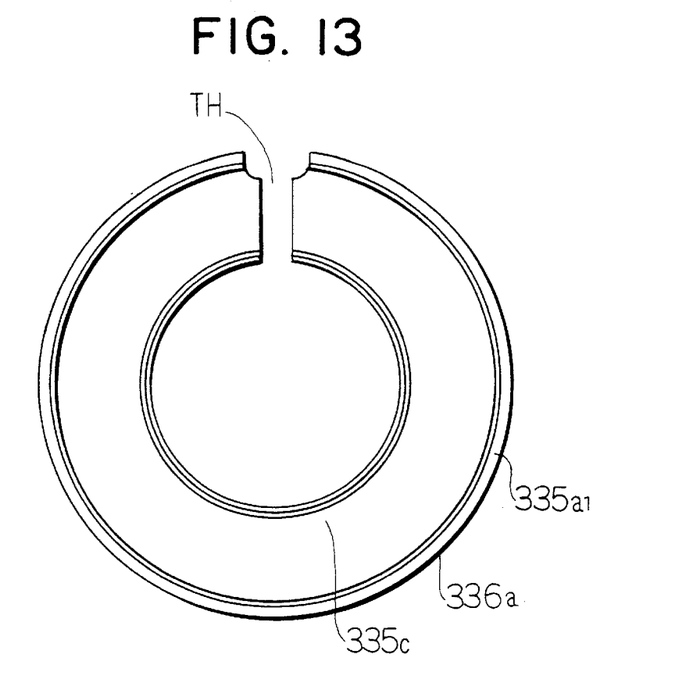
FIG. 13 is a plan view showing one of a plurality of stator core divisions constituting the stator core unit shown in FIG. 12.
Figure 14:
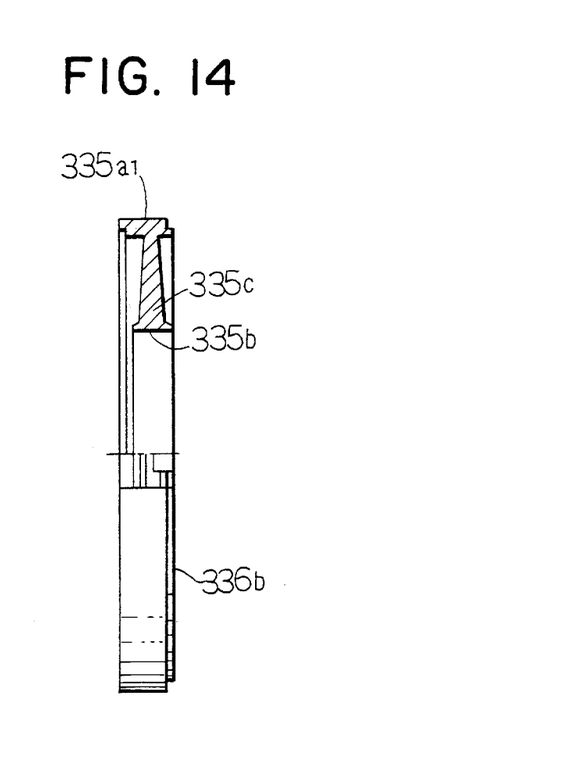
FIG. 14 is a partially cutaway side elevation view showing one of stator core divisions constituting the stator core unit shown in FIG. 12.

Referring now to FIGS. 12 to 14, still another embodiment of a cylinder-type linear synchronous motor according to the present intention is illustrated; wherein FIG. 12 is a half-sectional view showing a stator core constituted of a single stator core unit 335, FIG. 13 is a plan view showing a stator core division 336a which is a first one of ten stator core divisions 336a to 336j constituting the stator core unit 335, and FIG. 14 is a partially cutaway side elevation view showing the stator core division 336b which is one of the stator core divisions 336b to 336i formed into the same configuration. The stator core divisions 336a to 336j each include an annular yoke constituting section 335a1 arranged so as to be concentric with a direct-acting shaft and an annular magnetic pole section 335c constructed so as to be integral with the yoke constituting section 335a1. In this instance, the stator core divisions 336a and 336i arranged on both sides in an axial direction of the direct-acting shaft each are formed with a through-groove TH so as to extend in a radial direction thereof, through which a lead wire of an annular winding is led out. Thus, the yoke constituting section and magnetic pole section of each of the stator core divisions 336a and 336i each are not fully annular. However, the term "annular shape" used herein includes such a shape which is not fully annular as well. The stator core divisions 336b to 336i are combined with each other through combination structures each constituted by a fit structure formed on each of the annular yoke constituting sections 335a1. A slit 338 in which the annular winding (not shown) is received is formed into an annular shape which is gradually reduced in width toward an opening 338b. The stator core divisions 336b to 336i each are integrally made of a magnetically conductive material. Only one such stator core unit 335 exhibits substantially the same advantage as the above-described plural stator core units combined.

The above-described excitation of the annular windings is merely exemplary, thus, the annular windings may be excited in any other suitable manner so long as it permits generation of a shifting magnetic field.

The cylinder-type linear synchronous motor of each of the above-described embodiments is so constructed that shifting of a direction in which an exciting current flows through each of the annular windings of the stator causes a polarity appearing on the magnetic pole face of each of the magnetic pole sections to be changed, to thereby generate a shifting magnetic field, resulting in generating thrust required for shifting the direct-acting shaft in the axial direction between at least one permanent magnet train and the plural magnetic sections. Such construction permits generation of thrust at an increased magnitude as compared with the conventional cylinder-type linear stepping motor. In particular, in the present invention, the annular windings formed so as to surround the movable element are used for the stator and the annular windings each are fitted at a part thereof in each of the slots between the magnetic pole sections adjacent to each other in the axial direction. Such configuration eliminates a necessity of forming the annular winding on the magnet pole section of the stator core unit, resulting in thrust at a large magnitude being obtained.

As can be seen form the foregoing, in the present invention, the stator core unit is formed by a combination of the plural stator core divisions with each other in the axial direction. Such construction permits a length of the stator core unit to be optionally determined depending on the number of stator core divisions and a configuration thereof. Thus, when it is desired to increase the number of phases of the exciting currents or increase a length of the permanent magnet train, to thereby obtain thrust at an increased magnitude, it is not required to newly design and manufacture the stator core unit.

Also, the annular winding can be arranged at a part thereof in the slot during assembling of the stator core divisions, so that a combination between the stator core units and the annular windings may be facilitated, resulting in assembling of the stator being facilitated.

Further, the annular winding is interposed at a part thereof between each adjacent two stator core units, so that the annular winding may be effectively received at a part thereof in the slot even when a width of an opening of the slot in the axial direction on a side of the movable element is reduced. Also, such construction permits a space factor of the annular winding in the slot to be increased as compared with forcing of the annular winding into the slot which is carried out in the prior art.

While preferred embodiments of the invention have been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A cylinder-type linear synchronous motor comprising:
   a movable element including a direct-acting shaft arranged so as to be reciprocated in an axial direction thereof, a magnet mount fixed on said direct-acting shaft and at least one permanent magnet train constituted by a plurality of permanent magnets fixed on said magnet mount and arranged in said axial direction; and
   a stator including at least one stator core unit and a plurality of annular windings arranged so as to be spaced from each other at predetermined intervals in said axial direction and in a manner to surround said movable element;
   said stator core unit including a plurality of magnetic pole sections arranged so as to be opposite to said permanent magnet train of said movable element with a predetermined interval being defined therebetween and a yoke for magnetically connecting said magnetic pole sections to each other;
   said magnetic pole sections being spaced from each other at intervals in said axial direction so that a slot in which each of said annular windings is fitted at a part thereof is defined between each adjacent two of said magnetic pole sections; said stator core unit being constituted by combining a plurality of stator core divisions with each other in said axial direction;
   said stator core divisions provided with combination structures so as to be positioned at portions of said yoke corresponding to said slots of said stator core unit; said combination structures being constructed so as to be combined with each other in said axial direction.

2. A cylinder-type linear synchronous motor as defined in claim 1, wherein said slots each include an opening open to said movable element and a winding receiving section in which at least a part of each of said annular windings is received;
   said opening having a width in said axial direction formed so as to be smaller than a width of said winding receiving section in said axial direction.

3. A cylinder-type linear synchronous motor as defined in claim 1 or 2, wherein one said stator core unit is arranged; and
   said stator core divisions each include an annular yoke constituting section arranged so as to be concentric with said direct-acting shaft and an annular magnetic pole section constructed so as to be integral with said yoke constituting section.

4. A cylinder-type linear synchronous motor as defined in claim 2, wherein said stator core divisions each are integrally formed of a magnetically conductive material.

5. A cylinder-type linear synchronous motor as defined in claim 1, wherein a plurality of said stator core units are arranged so as to be spaced from each other at predetermined angular intervals in a peripheral direction of said direct-acting shaft;

said stator core divisions constituting each of said stator core units each include one said magnetic pole section and a yoke constituting section constituting a part of said yoke; and said stator core divisions each are formed by laminating a plurality of silicon steel sheets on each other.

6. A cylinder-type linear synchronous motor comprising:

a movable element including a direct-acting shaft arranged so as to be reciprocated in an axial direction thereof, a magnet mount fixed on said direct-acting shaft and a plurality of permanent magnets fixed on said magnet mount and arranged in said axial direction; and a stator including a plurality of annular windings arranged so as to be spaced from each other at predetermined intervals in said axial direction and a plurality of stator core units each including a plurality of magnetic pole sections arranged so as to be opposite to said permanent magnets of said movable element with a redetermined interval defined therebetween and a yoke for magnetically connecting said magnetic pole sections to each other;

said magnetic pole sections being spaced from each other at intervals in said axial direction so that a slot in which each of said annular windings is fitted at a part thereof is defined between each adjacent two of said magnetic pole sections;

said stator core units being arranged so as to be spaced from each other at predetermined angular intervals in a peripheral direction of said direct-acting shaft;

said stator core units being constituted by combining a plurality of stator core divisions with each other;

said stator core divisions each including one said magnetic pole section and a yoke constituting section constituting said yoke;

whereby a direction of an exciting current flowing through each of said annular windings is shifted to vary a polarity of a magnetic pole appearing on a magnetic pole face of each of said magnetic pole sections, to thereby generate a shifting magnetic field, so that thrust for shifting said direct-acting shaft in said axial direction may be generated between each of said permanent magnets and each of said magnetic pole sections.

7. A cylinder-type linear synchronous motor as defined in claim 6, wherein said slots each include an opening open to said movable element and a winding receiving section in which at least a part of each of said annular windings is received;

said opening having a width in said axial direction formed so as to be smaller than a width of said winding receiving section in said axial direction.

8. A cylinder-type linear synchronous motor as defined in claim 6 or 7, wherein said stator core divisions each are formed by laminating a plurality of silicon steel sheets on each other;

said yoke constituting section of each of said stator core divisions being formed on an end surface thereof combined with each of other stator core divisions with a slit which is open in said peripheral direction and one side of said axial direction;

two such slits formed on each adjacent two of said stator core divisions being aligned with each other while keeping each two of said stator core divisions combined with each other;

said two slits aligned with each other being fitted therein with a strip-like member for positioning.

9. A cylinder-type linear synchronous motor as defined in claim 8, wherein said strip-like linear member is constituted by a part of a metal ring member;

said ring member being commonly used also as said strip-like member for said stator core units arranged in said peripheral direction.

10. A cylinder-type linear synchronous motor as defined in claim 8, wherein of said stator core divisions, two end-side stator core divisions positioned on both sides in said axial direction are formed into same configuration wherein said yoke constituting section is formed with one said slit; and one or more of the other stator core divisions interposed between said two end-side stator core divisions are formed into the same configuration wherein said yoke constituting section is formed with two said slits.

11. A cylinder-type linear synchronous motor as defined in claim 6, wherein said movable element is arranged so as to be slid in said stator;

said stator is securely fitted on a frame formed therein with a stator fit hole;

said stator fit hole being formed into a cylindrical shape; and said stator core units each are formed so as to be fitted in said cylindrical stator fit hole.

12. A cylinder-type linear synchronous motor as defined in claim 6, wherein said magnetic pole face of said magnetic pole section is formed with at least one pseudo-slit which is open to said movable element;

said pseudo-slit functioning to reduce cogging torque.

13. A cylinder-type linear synchronous motor as defined in claim 8, wherein a plurality of annular permanent magnets magnetized so as to permit an N or S pole to appear on an outer surface thereof in a radial direction thereof are fittedly arranged on an outer periphery of said magnet mount of said movable element in a manner to be spaced from each other at predetermined intervals in said axial direction so that N poles and S poles are alternately arranged in said axial direction; and said annular permanent magnets are arranged so that portions thereof opposite to the magnetic pole sections of said stator core unit constitute said permanent magnets of said permanent magnet train.

14. A cylinder-type linear synchronous motor comprising:

a pair of linear bearings mounted on both ends of a casing including a frame of a cylindrical shape;

a movable element including a direct-acting shaft supported in said linear bearings so as to be linearly reciprocated, a magnet mount formed of a magnetically permeable material, arranged in said frame while being fixed on said direct-acting shaft and including a magnet mounting section extending in an axial direction of the direct-acting shaft, and at least one permanent magnet train including a plurality of permanent magnets supported on said magnet mounting section of said magnet mount and arranged in said axial direction so that N and S poles may alternately appear on magnetic pole faces of said permanent magnets; and a stator including at least one stator core unit which includes a base fixed on an inner periphery of said frame and a plurality of magnetic pole sections having magnetic pole faces opposite to said permanent magnet train in a radial direction of said direct-acting shaft and arranged so as to be spaced from each other at predetermined intervals in said axial direction;

said stator further including a plurality of exciting windings for exciting said magnetic pole sections of said stator core unit;

said exciting windings being so constructed that a direction of exciting current flowing through said exciting windings is shifted to change polarities appearing on said magnetic pole faces of said magnetic pole sections, to thereby generate shifting magnetic fields, resulting in thrust for shifting said direct-acting shaft in said axial direction occurring between said permanent magnet train and said magnetic pole sections;

said exciting windings of said stator each being formed by annularly winding a conductive wire so as to surround a periphery of said movable element in a peripheral direction thereof;

said exciting windings each being fitted at a part thereof in a slot formed between each axially adjacent two of said magnetic sections;

said stator core unit being formed by a combination of a plurality of stator core divisions each including one said magnetic pole section and a yoke constituting section constituting said yoke.

15. A cylinder-type linear synchronous motor comprising:

a frame of a cylindrical shape having a cavity formed therein;

a pair of end brackets fixed on both ends of said frame;

a pair of linear bearings each mounted on each of said end brackets;

a movable element including a direct-acting shaft supported in said linear bearings so as to be linearly reciprocated, a magnet mount formed of a magnetically permeable material, arranged in said cavity of said frame while being fixed on said direct-acting shaft and including a magnet mounting section extending in an axial direction of the direct-acting shaft, and m (m: a positive integer of 2 or more) permanent magnet trains constituted by a plurality of permanent magnets supported on said magnet mounting section of said magnet mount and arranged in said axial direction so that N and S poles may alternately appear on magnetic pole faces of said permanent magnets; and a stator including m stator core units each including a base fixed on an inner periphery of said frame and n (n: a positive integer of 3 or more) magnetic pole sections of which magnetic pole faces are arranged opposite to said permanent magnet trains in a radial direction of said direct-acting shaft and which are arranged so as to be spaced from each other at predetermined intervals in said axial direction;

said stator also including a plurality of exciting windings for exciting said magnetic pole sections of said stator core unit so that a magnetic pole of a predetermined polarity appears on each of said magnetic pole faces of said magnetic pole sections;

said exciting windings being so constructed that exciting currents of p (p: a positive integer of 2 or more) phases different in phase angle are flowed through said exciting windings to vary a polarity of a magnetic pole appearing on each of the magnetic pole faces of said magnetic pole sections, to thereby generate a shifting magnetic field, resulting in thrust for shifting said direct-acting shaft in said axial direction occurring between said permanent magnet trains and said magnetic pole sections of said stator core units;

said stator core units being arranged so as to be spaced from each other at substantially equal intervals in a peripheral direction of said movable element;

said exciting windings of said stator being constituted by pxq (q: a positive integer of 1 or more) by annularly winding a conductive wire so as to surround a periphery of said movable element in the peripheral direction;

said n being defined by n=pxq+1;

said exciting windings each being fitted at a part thereof in each of n−1 slots formed between respective axially adjacent two of said magnetic sections;

said stator core unit being formed by a combination of a plurality of stator core divisions including combination structures arranged at portions of said yoke corresponding to said slots of said stator core unit and constructed so as to be combined with each other in said axial direction.

16. A cylinder-type linear synchronous motor as defined in claim 14 or 15, wherein said exciting windings each are wound on a bobbin made of an insulating material;

said bobbin being fitted at a part thereof in said slot.

17. A cylinder-type linear synchronous motor as defined in claim 15, wherein said m is even.

18. A cylinder-type linear synchronous motor as defined in claim 14 or 15, further comprising a position detecting sensor arranged in said frame so as to detect axially positional relationship between said movable element and said stator.

* * * * *